United States Patent
Hansen

(10) Patent No.: US 7,536,897 B2
(45) Date of Patent: May 26, 2009

(54) MECHANICAL CONNECTION FOR TRANSFERRING FORCES WHILE PROVIDING INSULATION

(75) Inventor: Bjarne Hansen, Pontvallain (FR)

(73) Assignee: Amada Europe, Tremblay-en-France (FR)

( * ) Notice: Subject to any disclaimer, the term of this patent is extended or adjusted under 35 U.S.C. 154(b) by 0 days.

(21) Appl. No.: 11/984,080

(22) Filed: Nov. 13, 2007

(65) Prior Publication Data
US 2008/0115557 A1 May 22, 2008

(30) Foreign Application Priority Data
Nov. 20, 2006 (FR) .................. 06 54984

(51) Int. Cl.
*B21D 5/02* (2006.01)
(52) U.S. Cl. .............. 72/455; 72/389.3; 72/447; 100/214; 100/258 R
(58) Field of Classification Search .......... 72/447, 72/455, 456, 389.3, 389.6, 389.7; 100/214, 100/258 R, 258 A, 269 R
See application file for complete search history.

(56) References Cited

U.S. PATENT DOCUMENTS

| | | | | |
|---|---|---|---|---|
| 3,163,105 A | * | 12/1964 | Pearson | 100/214 |
| 3,852,991 A | * | 12/1974 | Poggio | 72/389.3 |
| 4,873,923 A | * | 10/1989 | Manning | 100/258 R |
| 5,272,904 A | * | 12/1993 | Krumholz | 72/455 |
| 7,134,314 B1 | * | 11/2006 | Peterson et al. | 72/455 |
| 7,281,462 B2 | * | 10/2007 | Anderl | 83/537 |

FOREIGN PATENT DOCUMENTS

| | | |
|---|---|---|
| DE | 40 01 993 A1 | 7/1990 |
| DE | 198 06 707 C1 | 5/1999 |
| EP | 0 663 507 A2 | 7/1995 |
| EP | 1 228 822 A1 | 8/2002 |
| FR | 2 201 973 A1 | 5/1974 |
| WO | WO 92/14603 A | 9/1992 |

* cited by examiner

*Primary Examiner*—David B Jones
(74) *Attorney, Agent, or Firm*—Kenyon & Kenyon LLP

(57) ABSTRACT

The invention relates to a connection device between a moving member and the moving end of a drive device. It comprises:
- a mechanical connection element in contact with said moving member; and
- a thermal insulator element interposed between said mechanical connection element and said end of the drive device, whereby the heat produced by said drive device is substantially not transmitted to said moving member.

The invention is applicable to making press brakes.

6 Claims, 2 Drawing Sheets

MECHANICAL CONNECTION FOR TRANSFERRING FORCES WHILE PROVIDING INSULATION

The present invention provides a mechanical connection device between a moving member and the moving end of a drive device, and more particularly such a mechanical connection device that serves substantially to prevent the transmission of heat from the drive device to the moving member while allowing large forces to be transmitted. The invention also relates to a drive system using such a mechanical connection device and to a press brake for folding sheet metal and including such a drive system.

BACKGROUND OF THE INVENTION

It is well known that when two parts presenting relatively high coefficients of thermal expansion are in intimate contact, and one of the elements in contact is at a temperature higher than ambient temperature, then heat will propagate to the other part, thereby causing said other part to expand thermally.

When the part is of dimensions that are large compared with the contacting surfaces that constitute the heating points, the temperature at each point along the part varies and becomes distributed so as to present isothermals in the material constituting the part around the heating points. This situation may be unstable over time if the transmission of energy through the contact surface(s) is not constant, if ambient temperature is not constant, or if the heat dissipated through the set of contacting surfaces is less than that transmitted by the heating surface(s).

When free thermal expansion is not possible, thermal tensions in compression and deformation become present locally at the site of the local heating, and the magnitudes thereof can be calculated.

Regardless of whether the thermal expansion is free or involves internal thermal tensions, the result is mechanical deformation of the part.

Given the shape of the part and the locations of the heating points, thermal tensions can give rise overall to maximum deformations that are considerably greater than would happen if the part were heated uniformly. This situation is created by the fact that even though the local heating surface areas are very small, they create local thermal tensions and deformations that are strong and that deform zones remote from the heating surfaces by a "lever arm" system, even when those zones are themselves subjected to little heating. It is precisely the temperature difference between the various portions of a single part that make free thermal expansion impossible without creating internal thermal tension.

The inventors have shown that this situation is to be found particularly, but not exclusively, in controlling the displacement of mechanical members in machine tools, and in particular when controlling press brakes for folding sheet metal.

FIG. 1 is a diagram of a press brake 10 with a frame 12, a moving top die 14 that carries fastener members 16 for securing to folding tools, and a bottom die 18 that carries fastener members for folding V-shapes 20. In conventional manner, movement in translation of the top die 14 is controlled by two hydraulic rams 22 and 24 having cylinders 22*a*, 24*a* that are secured to the frame 12 and that have the ends of their pistons 22*b*, 24*b* secured to the top ends of the moving die 14. The dimensions of the top die are of the order of:

length: 1200 millimeters (mm) to 6000 mm;
height: 1000 mm to 3000 mm; and
thickness: 40 mm to 120 mm.

Tests carried out by the inventors have shown that the hydraulic rams 22 and 24, like most other force generators, such as electromechanical ball-screw actuators, have a continuous operating temperature that exceeds ambient temperature by a few degrees or a few tens of degrees Celsius. That heating is produced by various internal sources of friction between moving and stationary parts, by hysteresis in the material that is subjected to reciprocating loading by hot hydraulic oil passing into the ram, and continuously heating the piston. The hydraulic oil passing through the ram can reach 70° C. and the piston can reach about 60° C. The faces of the pistons 22*b* and 24*b* of the rams close to the action surface 26 on the top die 14 are at about 40° C. while ambient temperature is 17° C., and the central portions of the top die are at about 20° C. As can be seen more clearly in FIG. 2, these temperatures going away from the contact surface 26 between the ram 24 and the top die 14 are distributed and present isothermals I. When a press brake, only the deformation of the bottom edge 28 of the top die, as represented by line J, is significant. For the performance of the press brake, it is this deformation that is significant and it results from the superposition of the two above-described phenomena:

firstly, linear thermal expansion is free and there is no thermal stress in the vertical direction. A mean temperature rise of 10° in this zone that has a height of 400 mm gives a theoretical linear expansion of 48 micrometers (μm) in application of a well-known formula, which deformation corresponds to that which can be measured on a real machine; and secondly, the deformation of the central portion of the top die is produced by thermal tensions associated with the heating of the material beneath and beside the action points of the rams.

In present press brakes, the positions of the control rams can be defined with accuracy of 1 μm to 2 μm. It is therefore unacceptable for deformation of the bottom edge 28 of the top die 14 being capable of reaching 48 μm.

OBJECTS AND SUMMARY OF THE INVENTION

A first object of the present invention is to provide a mechanical connection device between a moving member and the moving end of a drive device that is liable to rise in temperature, which device enables the transmission of heat to the moving member to be eliminated or to be reduced very considerably, while nevertheless enabling a large force to be transmitted between the drive device and the moving member.

According to the invention, this object is achieved by a connection device between a moving member and a drive device liable to lead to heating, said drive device having a moving end and being suitable for moving said moving member, the connection device comprising:

a mechanical connection element in contact with said moving element; and a thermal insulator element interposed between said mechanical connection element and said end of the drive device, whereby the heat produced by said drive device is substantially not transmitted to said moving member.

It will be understood that interposing the thermal insulator element in the connection device between the moving end of the drive device and the moving member makes it possible to reduce very considerably the heat flux flowing between the drive device and the moving member, thus making it possible to reduce very considerably the phenomena of thermal expansion in the moving member.

Preferably, the connection device further comprising a securing element for connecting the moving end of the drive device to the moving member, with a second thermal insulator element being interposed between said securing element and said moving member.

It will be understood, that by means of this disposition, it is ensured that an effective bidirectional connection is provided between the end of the drive device and the moving member, while maintaining very good thermal insulation between the "hot" drive device and the moving member.

Preferably, the thermal insulator devices are made of a synthetic composite which, preferably, has a thermal insulator material has a static elastic stress limit of not less than 50 megapascals (MPa) and a thermal conductivity coefficient of less than 0.5 watts per millikelvin (W/mK).

A second object of the invention is to provide a drive system using such a mechanical connection device that avoids transmitting heat flux so as to control the displacement of the moving die of a press brake for folding sheet metal.

The drive system using a connection device of the above-defined type being wherein said moving end of said drive device is the end of a ram piston acting on a surface of said moving member, wherein said connection element is a plate pressed against said surface, and wherein said thermal insulator element has a first ball-joint face suitable for co-operating with a second ball-joint face formed at the end of said piston.

A third object of the invention is to provide a press brake using two drive systems of the type mentioned above.

BRIEF DESCRIPTION OF THE DRAWINGS

Other characteristics and advantages of the invention appear better on reading the following description of an embodiment of the invention given by way of non-limiting example. The description refers to the accompanying figures, in which.

MORE DETAILED DESCRIPTION

Figure 3:
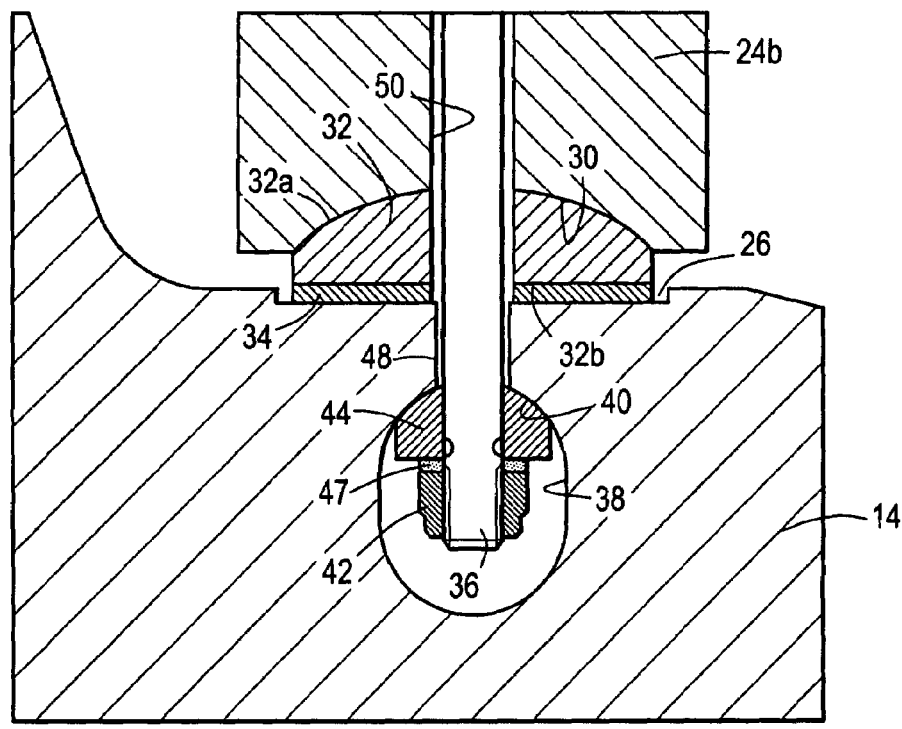
FIG. 3 shows an embodiment of the mechanical connection between the piston of a control ram and the moving top die of a press brake.
Figure 4:
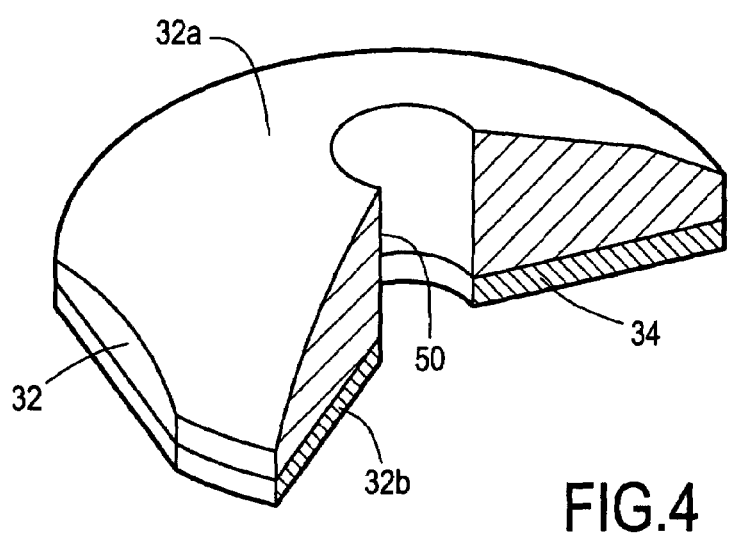
FIG. 4 is a partially cutaway perspective view of a thermal insulator element.

With reference now to FIGS. 3 and 4, there follows a description of a preferred embodiment of the mechanical connection between the end of the piston of a hydraulic ram and the top die of a press brake of the type described above. Naturally, the description merely constitutes one example of how the mechanical connection device of the invention can be used, and numerous other applications could be envisaged.

Figure 1:
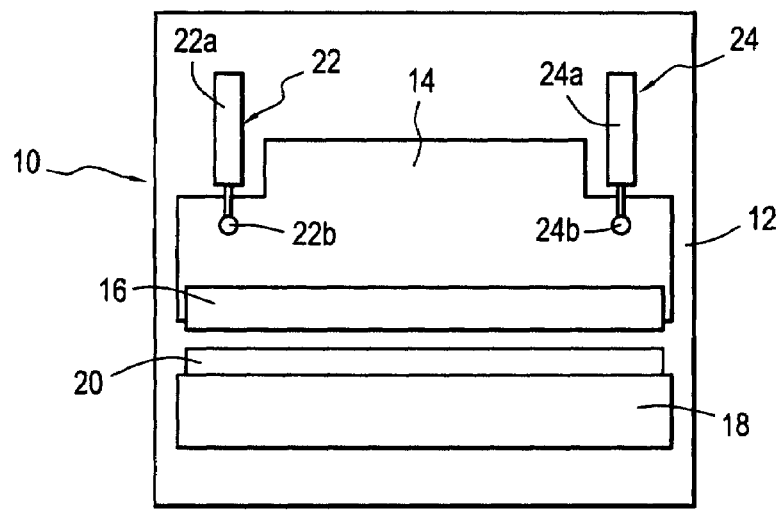
FIG. 1, described above, is an elevation view of a press brake.
Figure 2:
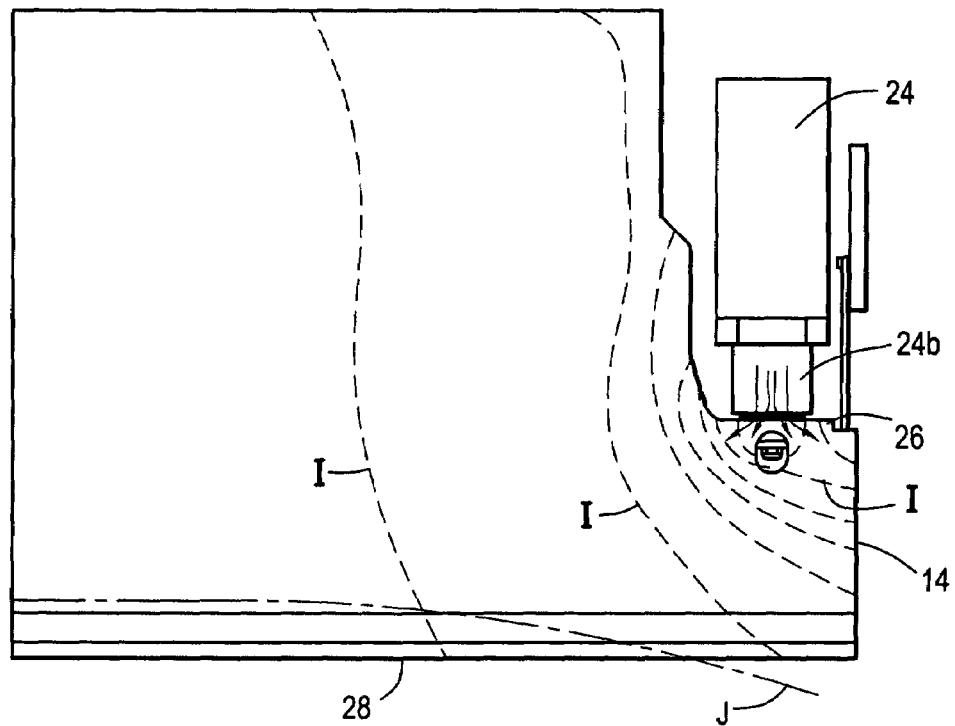
FIG. 2, described above, shows half of the top die of a press brake with isothermals being shown in the top die.

In FIG. 3, there can be seen a portion of the top die 14 of the press brake of FIGS. 1 and 2, together with the piston 24b of the actuator 24 and the face 26 of the top die against which the piston of the ram is to apply a force. In this embodiment, the end of the piston 24b is partially in the form of a concave spherical cap 30 constituting a ball-joint surface. Between the end of the piston of the ram 24b and the surface 26, there are interposed firstly an insulator element 32 and secondly a metal element 34. The insulator element 32 has a top face 32a in the form of a convex spherical cap and it co-operates with the end of the piston of the actuator that is in the form of a concave spherical cap 30, and it also presents a second face 32b that is substantially plane and applied against the metal element 34. It will thus be understood that there is no heat bridge between the piston 24b of the actuator and the top ram 14, except via the insulator element 32 that presents very high thermal resistivity.

The metal element 34 is merely preferred and it serves to distribute the bending force over the insulating ball-joint element 32.

To provide a bidirectional mechanical connection between the piston of the ram 24a and the die 14, the mechanical connection system is preferably associated with the following elements. A metal rod 36 extends along the axis of the ram piston 24b and projects beyond the bottom end thereof. In the body of the die 14 there is formed a recess in a direction perpendicular to the front face of the die, which recess is referenced 38. This recess 38 has a top wall portion 40 of semicylindrical shape. The mechanical connection is finished off by a nut 42 that co-operates with the threaded end of the rod 36 via a thermal insulator element 44 that is half-round, and an elastically-deformable washer 47. Further, it should be added that the diameter of the passage 48 made in the die to enable the rod 36 to be inserted is greater than the outside diameter of the rod, so as to avoid any contact between the rod and the die. In addition, the circular opening 50 formed in the insulator element 32 and the washer 47 is large enough to ensure that there is no contact between the rod 36 and the element 34.

It can thus be understood that the source of heat constituted by the piston 24b of the ram and its rod 36 is completely insulated thermally from the die 14 by the presence of the thermal insulator elements 32 and 44. Nevertheless, this form of connection enables a large force to be transmitted between the ram piston and the die 14.

The thermal insulator elements 32 and 44 are preferably constituted using a synthetic composite that can be made from a cotton cloth soaked in epoxy and subsequently dried. There also exist certain ceramics that can be suitable for making the thermal insulator elements. These thermal insulator elements present a thermal conductivity coefficient that is very small, typically of the order of 0.29 W/mK and in any event less than 0.5 W/mk. In addition, this thermal insulator material presents a static elastic stress limit that is very high, greater than 50 megapascals (MPa) and preferably of the order of 100 MPa.

Measurements performed on a press brake, in which the connection between the ram pistons and the top die was made in accordance with the invention, have shown that the mean temperature rise under the end of the ram piston is about 1° C. and the thermal expansion is less than 5 µm for the bottom edge 28 of the top die 14 of the press brake.

What is claimed is:

1. A connection device between a moving member and a drive device liable to lead to heating, said drive device having a moving end and being suitable for moving said moving member, the connection device comprising:
  a mechanical connection element in contact with said moving element; and
  a thermal insulator element interposed between said mechanical connection element and said end of the drive device, whereby the heat produced by said drive device is substantially not transmitted to said moving member, wherein the thermal insulator element is made of a synthetic composite, the synthetic composite including a thermal insulator material having a elastic stress limit of not less than 50 MPa and a thermal conductivity coefficient of less than 0.5 W/mK.

2. A connection device according to claim 1, further comprising a securing element for connecting the moving end of the drive device to the moving member, with a second thermal insulator element being interposed between said securing element and said moving member.

3. A drive system using a connection device according to claim 1, wherein said moving end of said drive device is the end of a ram piston acting on a surface of said moving member, wherein said connection element is a plate pressed against said surface, and wherein said thermal insulator element has a first ball-joint face suitable for co-operating with a second ball-joint face formed at the end of said piston.

4. A drive system according to claim 3, further comprising a securing element for connecting the moving end of the drive device to the moving member, with a second thermal insulator element being interposed between said securing element and said moving member, wherein said securing element comprises a rod secured to the end of said piston, a clamping member co-operating with said rod, and wherein said second thermal insulator element is interposed between a second surface of said moving member and said clamping element, said rod having no contact with said moving member or said connection element.

5. A drive system according to claim 4, wherein said second surface is a ball-joint surface and the face of the second thermal insulator element applied against said second surface is a complementary ball-joint face.

6. A press brake comprising a frame, a moving die, and two drive systems secured to the frame, the press brake being wherein each drive device is in accordance with claim 3, and wherein the end of the piston of each ram is connected to one end of said moving die that constitutes the moving member.

* * * * *